(12) United States Patent
Doat et al.

(10) Patent No.: US 8,007,843 B2
(45) Date of Patent: Aug. 30, 2011

(54) METHOD FOR PREPARING A DAIRY PRODUCT

(75) Inventors: Stephane Doat, La Ville Du Bois (FR); Elena Vela Roca, Barcelona (ES); Agusti Montserrat Carreras, Barcelona (ES); Ricardo Weill, Bueno Aires (AR); Claude Emmanuelle Gaspard, Paris (FR); Bernard Robine, Les Plessis Robinson (FR)

(73) Assignee: Compagnie Gervais Danone, Paris (FR)

( * ) Notice: Subject to any disclaimer, the term of this patent is extended or adjusted under 35 U.S.C. 154(b) by 1230 days.

(21) Appl. No.: 10/589,506

(22) PCT Filed: Feb. 1, 2005

(86) PCT No.: PCT/FR2005/000203
§ 371 (c)(1),
(2), (4) Date: Dec. 12, 2006

(87) PCT Pub. No.: WO2005/087021
PCT Pub. Date: Sep. 22, 2005

(65) Prior Publication Data
US 2007/0190220 A1    Aug. 16, 2007

(30) Foreign Application Priority Data

Feb. 16, 2004  (FR) ..................... 04 01513

(51) Int. Cl.
*A23C 9/12*   (2006.01)
*A23C 9/133*  (2006.01)
*A23C 9/13*   (2006.01)
(52) U.S. Cl. ............. 426/34; 426/42; 426/43; 426/580
(58) Field of Classification Search .................. 426/580, 426/34, 43, 44
See application file for complete search history.

(56) References Cited

U.S. PATENT DOCUMENTS

| | | |
|---|---|---|
| 6,391,370 B1 | 5/2002 | Gaonkar et al. |
| 6,627,245 B1 | 9/2003 | Doat et al. |
| 6,753,032 B1 * | 6/2004 | Hirokawa et al. ............. 426/611 |
| 7,553,510 B2 * | 6/2009 | Doat et al. .................... 426/602 |
| 2004/0029844 A1 * | 2/2004 | Yoon et al. .................... 514/169 |

FOREIGN PATENT DOCUMENTS

| | | |
|---|---|---|
| EP | 1 212 945 | 6/2002 |
| WO | WO 00/33669 | 6/2000 |
| WO | WO 03/055324 | 7/2003 |
| WO | WO 03/077679 | 9/2003 |
| WO | WO 2004/014141 | 2/2004 |

OTHER PUBLICATIONS

Mensink R P et al: "Effects of Plant Stanol Esters Supplied in Low-Fat Yoghurt on Serum Lipids and Lipoproteins, Non-Cholesterol Sterols and Fat Soluble Antioxidant Concentrations" Atherosclerosis, Amsterdam, NL, vol. 160, No. 1, Jan. 2002, pp. 205-213, XP001104063 ISSN: 0021-9150 p. 206, colonne 2.
Patent Abstracts of Japan vol. 2003, No. 12, Dec. 5, 2003 & JP 2004 018678 A (Ikeda Shokken KK), Jan. 22, 2004.
Patent Abstracts of Japan vol. 2002, No. 8, Aug. 5, 2002 & JP 2002 112725 A (Sooee Machine: KK), Apr. 16, 2002.
Patent Abstracts of Japan vol. 17, No. 200 (C-1050), Apr. 20, 1993 & JP 04 246765 A (Fujita Shiyokuhin: KK), Dec. 2, 1992.
Patent Abstracts of Japan vol. 2000, No. 13, Feb. 5, 2001 & JP 2000 303450 A (Taisei Corp), Oct. 31, 2000.

* cited by examiner

*Primary Examiner* — Carolyn Paden
(74) *Attorney, Agent, or Firm* — Young & Thompson

(57) ABSTRACT

A method for preparing a dairy product in a production line, includes a step of continuously injecting at least one sterol and/or stanol ester through the production line at a predetermined temperature $T_1$ no lower than the melting point of the ester, and particularly at a temperature of 35-80° C., and into a dairy composition at a predetermined temperature $T_2$ no lower than the temperature $T_1$, which composition consists of an initial emulsifier-free milk-based composition containing milk proteins, to give a mixture, wherein the step of injecting at least one sterol and/or stanol ester is carried out before a step of homogenizing the mixture.

7 Claims, 7 Drawing Sheets

METHOD FOR PREPARING A DAIRY PRODUCT

FIELD OF THE INVENTION

A subject of the present invention is a preparation method for a dairy product with a high water content containing high melting point and/or hydrophobic compounds, endowed with a biological activity of interest.

BACKGROUND OF THE INVENTION

Among these high melting point and/or hydrophobic compounds, the phytosterols are compounds which have a solid scientific record making it possible to confirm their blood cholesterol-lowering effect. Two types of phytosterols are available on the market: the sterols and stanols (hydrogenated sterols). These sterols or stanols are often offered by different suppliers in esterified form.

These compounds are incorporated in fatty foods such as margarines. Real difficulties exist in incorporating them into very aqueous products such as yogurts and dairy products in general.

The document EP 1 059 851 describes a means of incorporating phytosterols preferably in the form of powder. This powder form is offered less and less by suppliers of sterols in favour of oily forms. It is therefore of prime importance to find another effective means of incorporating phytosterols in this oily form into products with a high water content.

The International Application WO 01/32029 describes a composition comprising a vegetable oil or fat and one or more phytosterols or phytostanols in which the phytosterols and/or phytostanols, which are not in the form of esters, are essentially completely dissolved. The method used consists of heating the phytosterols and/or phytostanols to form a molten mass which is then added to a heated oil or to a heated fat, and the composition thus formed is then cooled down. As regards the possible uses mentioned in this application the preparation of a dairy-based beverage is described, comprising a stage of mixing xanthan gum, skimmed milk powder and skimmed milk, left at ambient temperature to rehydrate the milk powder. Then the mixture is subjected to stirring in order to obtain a uniform dispersion. An oil containing phytosterols is heated to 80° C. and added to the mixture during stirring, then the mixture is subjected to homogenization and UHT treatment. The addition of the oil containing phytosterols heated to 80° C. to the mixture which seems to be at ambient temperature leads to the recrystallization of the sterol which prevents the preparation of a dairy-based beverage or a yogurt.

The U.S. Pat. No. 6,190,270 describes a preparation method for a food ingredient comprising the following stages: heating of one or more sterols to their melting point, combination of the product obtained with one or more emulsifiers in order to produce a homogeneous mixture and cooling down of the mixture under stirring, in order to produce a food ingredient. In this document the use of an emulsifier is always provided.

The document EP 1 212 945 relates to a dairy-based beverage comprising a stanol ester at a rate of 0.2 to 2% by weight which can contain a thickener, among other ingredients. All the applications cited mention the use of stabilizers, essentially thickeners and sometimes emulsifiers.

SUMMARY OF THE INVENTION

The present invention results from the fact that it has unexpectedly been noted that the use of a sterol and/or stanol ester for the preparation of a fermented dairy product was possible without using an emulsifier.

The purpose of the present invention is therefore to provide a preparation method for a fermented dairy product involving the introduction of molten sterol and/or stanol ester between the preheating of the dairy composition and the homogenization phase.

The purpose of the present invention is therefore to provide a preparation method comprising the in-line injection of a sterol and/or stanol ester, without thickener and without emulsifier, into a dairy composition without emulsifier, taken to a temperature dependent on the melting temperature of the sterol and/or stanol ester.

DETAILED DESCRIPTION OF THE INVENTION

Figure 1:
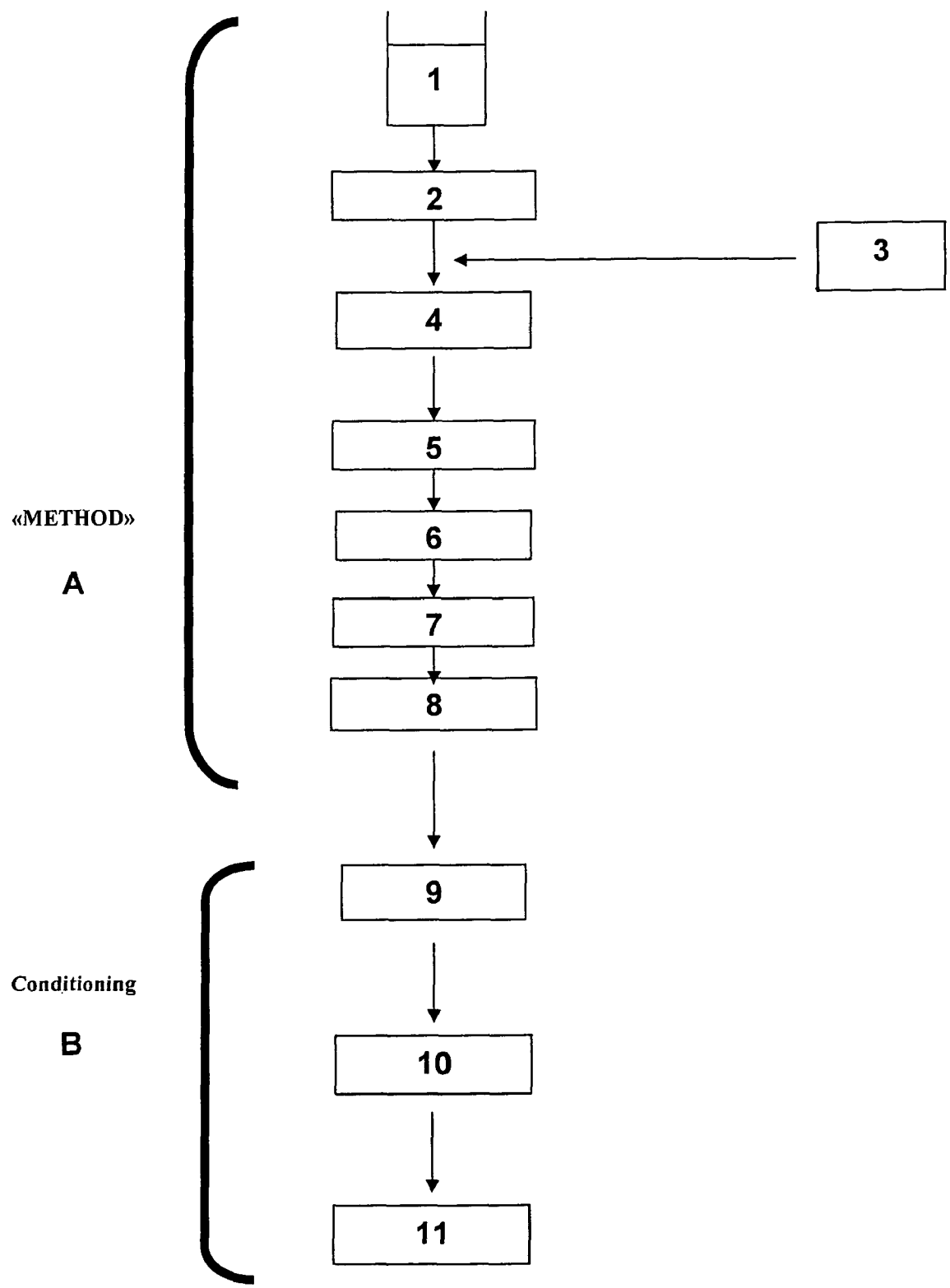
FIG. 1 represents the preparation method for a firm yogurt, into which a molten sterol and/or stanol ester is introduced after the preheating stage.

The present invention relates to a preparation method in a dairy product production line comprising a stage of introduction by continuous injection, via the production line, of at least one sterol and/or stanol ester at a given temperature $T_1$, higher than or equal to the melting temperature of said ester, and in particular ranging from 35 to 80° C., into a dairy composition having a given temperature $T_2$ at least equal to $T_1$, corresponding to an initial milk-based composition, containing milk proteins and without emulsifier, in order to obtain a mixture, said stage of introduction of the sterol and/or stanol ester taking place before a stage of homogenization of said mixture.

The expression "production line" designates all of the pipes and elements of the method such as pumps, heat exchangers, a homogenizer and a holder in which the dairy composition circulates.

The expression "continuous injection" designates a method consisting of a mixing of two fluids (in the present case a dairy composition and molten sterol and/or stanol ester) initially conveyed in separate lines, then mixed by joining these lines at a particular point of the method (before homogenization), and corresponds to an in-line injection.

The expression "milk-based initial composition" designates the starting dairy composition before any treatment, whereas the expression "dairy composition" corresponds to the initial milk-based composition which has undergone a treatment, in particular a heat treatment.

The expression "via the production line" refers to the fact of introducing the molten sterol and/or stanol ester via a production line into the production line of the dairy composition.

The temperature $T_2$ of the dairy composition into which the sterol and/or stanol ester is injected is equal to or higher than the temperature $T_1$ at which said ester is found, this temperature $T_1$ itself being equal to or higher than the melting temperature of the ester.

According to an advantageous embodiment of the invention, the temperature $T_2$ is approximately 5° C. higher than the melting temperature of the ester, and the temperature $T_1$ is approximately 2° C. higher than the melting temperature of the ester.

According to another embodiment, the temperature $T_1$ is approximately 5° C. to 10° C. higher than the melting temperature of the ester.

An advantageous method according to the present invention comprises a stage of continuous introduction of a sterol and/or stanol ester at a temperature $T_1$ ranging from 35 to 80° C., in particular from 40 to 70° C., and more particularly from 45 to 60° C., into the dairy composition as defined above.

The present invention relates to a method as defined above, comprising a stage of continuous introduction of a stanol ester at a temperature $T_1$ ranging from 60 to 80° C., and preferably from 65 to 70° C., into the dairy composition as defined above.

The present invention also relates to a preparation method for a dairy product as defined above, characterized in that it comprises the following stages:
  a stage of preheating the initial composition as defined above, said preheating stage being carried out at a temperature $T_1$ of approximately 50° C. to approximately 70° C., in particular approximately 55° C. to approximately 65° C., and preferably being carried out at approximately 65° C., in order to obtain a dairy composition at the preheating temperature,
  a stage of introduction by continuous injection of the sterol and/or stanol ester at a temperature $T_1$ as defined previously, into the abovementioned dairy composition at the preheating temperature, in order to obtain a mixture, and
  a stage of homogenization of said mixture.

This preferred embodiment corresponds to a rising-phase homogenization method.

The present invention also relates to a preparation method for a dairy product as defined above, characterized in that it comprises the following stages:
  a stage of heating a dairy composition corresponding to an initial milk-based composition, containing milk proteins and without emulsifier, said heating stage being carried out at a temperature $T_2$ of approximately 85° C. to approximately 100° C., in particular approximately 87° C. to approximately 97° C., advantageously approximately 87° C. to approximately 95° C., and preferably being carried out at approximately 95° C., in order to obtain a dairy composition at the heating temperature,
  a stage of introduction of the sterol and/or stanol ester at a temperature $T_1$ defined previously, into the abovementioned dairy composition at the heating temperature, in order to obtain a mixture, and
  a stage of homogenization of said mixture.

This preferred embodiment corresponds to an intermediate-phase homogenization method.

The present invention also relates to a preparation method for a dairy product as defined above, characterized in that it comprises the following stages:
  a stage of heating a dairy composition corresponding to an initial milk-based composition, containing milk proteins and without emulsifier, said heating stage being carried out at a temperature $T_2$ of approximately 85° C. to approximately 100° C., in particular approximately 87° C. to approximately 97° C., advantageously approximately 87° C. to approximately 95° C., and preferably being carried out at approximately 95° C., in order to obtain a dairy composition at the heating temperature,
  a stage of introduction of the sterol and/or stanol ester at a temperature $T_1$ defined previously, into the abovementioned dairy composition at the heating temperature, in order to obtain a mixture, and
  a stage of holding said mixture, said holding stage being carried out for a period sufficient to maintain the dairy composition originating from the heating stage for a period at the heating temperature, sufficient to destroy the vegetative microbial flora, in order to obtain a held mixture, and
  a stage of homogenization of the abovementioned held mixture.

This preferred embodiment corresponds to a descending-phase homogenization method.

The abovementioned holding stage corresponds to a stage allowing destruction of the vegetative microbial flora, including the pathogenic forms, for in particular approximately 4 minutes to approximately 10 minutes, in particular approximately 5 to approximately 8 minutes, and preferably being carried out for approximately 6 minutes.

The present invention also relates to a preparation method for a dairy product as defined above, characterized in that it comprises the following stages:
  a stage of preheating an initial milk-based composition, containing milk proteins and without emulsifier, at a preheating temperature of approximately 50° C. to approximately 70° C., in particular approximately 55° C. to approximately 65° C., and preferably being carried out at approximately 65° C., in order to obtain a dairy composition at the preheating temperature,
  a stage of introduction into the abovementioned dairy composition at the preheating temperature, of at least one sterol and/or stanol ester at the temperature $T_1$ defined previously, in order to obtain a mixture,
  a stage of homogenization of the abovementioned mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized mixture,
  a stage of heating the abovementioned homogenized mixture, said heating being carried out at a heating temperature of approximately 85° C. to approximately 100° C., in particular approximately 87° C. to approximately 97° C., advantageously approximately 87° C. to approximately 95° C., and preferably being carried out approximately 95° C., in order to obtain a heated homogenized mixture, and
  a stage of holding the abovementioned heated homogenized mixture, said holding stage being carried out at a temperature more or less equal to that of the preceding stage, namely the heating stage, in order to obtain a heated and homogenized held mixture.

According to an advantageous embodiment of the invention, the abovementioned holding stage is carried out in particular for approximately 4 minutes to approximately 10 minutes, in particular approximately 5 to approximately 8 minutes, and preferably for approximately 6 minutes.

The present invention also relates to a preparation method for a dairy product as defined above, characterized in that it comprises the following stages:
- a stage of preheating an initial milk-based composition, containing milk proteins and without emulsifier, at a preheating temperature of approximately 50° C. to approximately 70° C., in particular approximately 55° C. to approximately 65° C., and preferably being carried out at approximately 65° C., in order to obtain a dairy composition at the preheating temperature,
- a stage of heating the abovementioned dairy composition, said heating being carried out at a heating temperature $T_2$ of approximately 85° C. to approximately 100° C., in particular approximately 87° C. to approximately 97° C., advantageously approximately 87° C. to approximately 95° C., and preferably being carried out at approximately 95° C., in order to obtain a dairy composition at the heating temperature,
- a stage of introduction into the abovementioned dairy composition at the preheating temperature of at least one sterol and/or stanol ester at a temperature $T_1$ defined above, in order to obtain a mixture,
- a stage of homogenization of the abovementioned mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized mixture, and
- a stage of holding the abovementioned homogenized mixture, in order to obtain a homogenized held mixture.

According to an advantageous embodiment of the invention, the abovementioned holding stage is carried out in particular for approximately 4 minutes to approximately 10 minutes, in particular approximately 5 to approximately 8 minutes, and preferably for approximately 6 minutes.

The present invention also relates to a preparation method for a dairy product of the invention, characterized in that it comprises the following stages:
- a stage of preheating an initial milk-based composition, containing milk proteins and without emulsifier, at a preheating temperature of approximately 50° C. to approximately 70° C., in particular approximately 55° C. to approximately 65° C., and preferably being carried out at approximately 65° C., in order to obtain a dairy composition at the preheating temperature,
- a stage of heating the abovementioned dairy composition, said heating being carried out at a heating temperature $T_2$ of approximately 85° C. to approximately 100° C., in particular approximately 87° C. to approximately 97° C., advantageously approximately 87° C. to approximately 95° C., and preferably being carried out at approximately 95° C., in order to obtain a dairy composition at the heating temperature, and
- a stage of introduction into the abovementioned dairy composition at the preheating temperature of at least one sterol and/or stanol ester at a temperature $T_1$ defined previously, in order to obtain a mixture,
- a stage of holding the abovementioned mixture, in order to obtain a held mixture, and
- a stage of homogenization of the abovementioned held mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized held mixture.

According to an advantageous embodiment of the invention, the abovementioned holding stage is carried out in particular for approximately 4 minutes to approximately 10 minutes, in particular approximately 5 to approximately 8 minutes, and preferably for approximately 6 minutes.

The present invention also relates to a preparation method for a dairy product as defined previously, characterized in that it comprises the following stages:
- a stage of preheating an initial milk-based composition, containing milk proteins and without emulsifier, at a preheating temperature of approximately 50° C. to approximately 70° C., in particular approximately 55° C. to approximately 65° C., and preferably being carried out at approximately 65° C., in order to obtain a dairy composition at the preheating temperature,
- a stage of heating the abovementioned dairy composition, said heating being carried out at a heating temperature $T_2$ of approximately 85° C. to approximately 100° C., in particular approximately 87° C. to approximately 97° C., advantageously approximately 87° C. to approximately 95° C., and preferably being carried out at approximately 95° C., in order to obtain a dairy composition at the heating temperature,
- a stage of holding the abovementioned dairy composition at the heating temperature, in order to obtain a held dairy composition, said holding stage being carried out at a temperature more or less equal to that of the preceding stage, namely at the heating temperature,
- a stage of introduction into the abovementioned held dairy composition of at least one sterol and/or stanol ester at a temperature $T_1$ defined previously, in order to obtain a mixture,
- a stage of homogenization of the abovementioned mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized mixture.

According to an advantageous embodiment of the invention, the abovementioned holding stage is carried out in particular for approximately 4 minutes to approximately 10 minutes, in particular approximately 5 to approximately 8 minutes, and preferably for approximately 6 minutes.

According to an advantageous embodiment, a preferred method according to the present invention is characterized in that it comprises the following stages:
- a stage of preheating an initial milk-based composition, containing milk proteins and without emulsifier, at a preheating temperature of approximately 50° C. to approximately 70° C., in particular approximately 55° C. to approximately 65° C., and preferably being carried out at approximately 65° C., in order to obtain a dairy composition at the preheating temperature,
- a stage of introduction into the abovementioned dairy composition at the preheating temperature, of at least one sterol and/or stanol ester at a temperature $T_1$ defined previously, in order to obtain a mixture,
- a stage of heating the abovementioned mixture, said heating being carried out at a heating temperature $T_2$ of approximately 85° C. to approximately 100° C., in particular approximately 87° C. to approximately 97° C., advantageously approximately 87° C. to approximately 95° C., and preferably being carried out at approximately 95° C., in order to obtain a mixture at the heating temperature, a stage of holding the abovementioned mixture at the heating temperature, in order to obtain a held mixture, said holding stage being carried out at a temperature more or less equal to that of the preceding stage, namely at the heating temperature, and a stage of homogenization of the abovementioned held mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized mixture.

According to an advantageous embodiment of the invention, the abovementioned holding stage is carried out in particular for approximately 4 minutes to approximately 10 minutes, in particular approximately 5 to approximately 8 minutes, and preferably for approximately 6 minutes.

An advantageous method according to the present invention is a method as defined above, in which the holding stage is followed by the following stages:

a stage of fermentation of the heated and homogenized held mixture as defined above, carried out at a temperature of approximately 30° C. to approximately 47° C., in particular approximately 35° C. to approximately 45° C., and preferably approximately 38° C. to approximately 42° C., in order to obtain a fermented mixture, and an optional stage of smoothing the abovementioned fermented mixture, in order to obtain a final white mass, comprising a fatty phase, corresponding to the sterol and/or stanol ester, included by the homogenization stage in the protein network formed by the milk proteins and the milk of the abovementioned initial composition as defined previously, said final white mass being characterized in that it exhibits homogeneity between the fatty phase and the protein network, and exhibits no phase difference between the aqueous phase and the protein network.

According to an advantageous embodiment of the invention, the duration of the fermentation stage is from a few hours to a few days, and in particular approximately 3 hours to approximately 24 hours, and is preferably approximately 3 to approximately 12 hours, in particular approximately 5 to approximately 10 hours, and preferably approximately 6 to 9 hours.

Within the framework of the fermentation stage, the consumption of lactose by the lactic bacteria causes the formation of lactic acid and thus reduces the pH, which leads to the formation of the protein network.

Within the framework of the smoothing stage, in order to obtain a so-called "stirred" texture, the white mass is sheared and the fermentation is stopped by cooling down. An absence of serum is then observed on visual examination of a firm yogurt, as well as a homogeneity between the fatty phase and the protein network, according to the following two parameters:

the size of the fatty globules is comprised between 0.2 and 2 µm, in particular between 0.2 and 1 µm, and the organoleptic properties (no oily taste and no sandy appearance linked to the crystals of fatty material).

An advantageous method according to the present invention is a method as defined above, in which the smoothing stage is followed by a stage corresponding to the addition of a fruit preparation without sterol and/or stanol in any form whatever.

An advantageous method according to the present invention is a method as defined above, in which the smoothing stage is followed by a stage corresponding to the addition of a cereal-based composition without sterol and/or stanol in any form whatever.

An advantageous method according to the present invention is a method as defined above, characterized in that the fruit preparation comprises a thickener, in particular chosen from: xanthan gum, pectin, starch, in particular gelatinized, gelan gum, cellulose and its derivatives, guar and carob gum, and inulin, the concentration of these thickeners being approximately 0.4% to approximately 3% relative to the fruit preparation.

The present invention also relates to a preparation method for a dairy product as defined above, characterized in that it comprises the following stages:

a stage of preheating an initial milk-based composition, containing milk proteins and without emulsifier, at a preheating temperature $T_2$ of approximately 50° C. to approximately 70° C., in particular approximately 55° C. to approximately 65° C., and preferably being carried out at approximately 65° C., in order to obtain a dairy composition at the preheating temperature, a stage of introduction into the abovementioned dairy composition of at least one sterol ester at a temperature $T_1$ defined previously, in order to obtain a mixture, a stage of homogenization of the abovementioned mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized mixture, a stage of heating the abovementioned homogenized mixture, said heating being carried out at a heating temperature of approximately 85° C. to approximately 100° C., in particular approximately 87° C. to approximately 97° C., advantageously approximately 87° C. to approximately 95° C., and preferably being carried out at approximately 95° C., in order to obtain a heated homogenized mixture, and a stage of holding the abovementioned heated homogenized mixture, in order to obtain a heated and homogenized held mixture, a stage of fermentation of the abovementioned heated and homogenized held mixture, carried out at a temperature of approximately 30° C. to approximately 47° C., in particular approximately 35° C. to approximately 45° C., and preferably approximately 38° C. to approximately 42° C., in order to obtain a fermented mixture, and an optional smoothing stage of the abovementioned fermented mixture, in order to obtain a final white mass, comprising a fatty phase, corresponding to the sterol and/or stanol ester, included by the homogenization stage in the protein network formed by the milk proteins and the milk of the abovementioned initial composition as defined above, said final white mass being characterized in that it exhibits a homogeneity between the fatty phase and the protein network, and exhibits no phase difference between the aqueous phase and the protein network.

According to an advantageous embodiment of the invention, said holding stage being carried out for a period of approximately 4 minutes to approximately 10 minutes, in particular approximately 5 to approximately 8 minutes, and preferably for approximately 6 minutes.

This method makes it possible to obtain a dairy product of natural, firm or stirred yogurt type. In the absence of a smoothing stage, a firm yogurt is obtained, and in the presence of a smoothing stage, a stirred yogurt is obtained.

An advantageous method according to the present invention is a method as defined above, characterized in that the initial composition is without thickener.

This advantageous embodiment of the present invention makes it possible to obtain a product which exhibits a better homogeneity between the protein network and the fatty phase, insofar as the thickeners placed in an initial composition contribute to reducing the effectiveness of the protein network.

The present invention relates to a preparation method for a dairy product as defined above, characterized in that it comprises the following stages:

- a stage of preheating an initial milk-based composition, containing milk proteins and without emulsifier, at a preheating temperature $T_1$ of approximately 50° C. to approximately 70° C., in particular approximately 55° C. to approximately 65° C., and preferably being carried out at approximately 65° C., in order to obtain a dairy composition at the preheating temperature,
- a stage of introduction into the abovementioned dairy composition of at least one sterol and/or stanol ester at a temperature $T_1$ defined previously, in order to obtain a mixture,
- a stage of homogenization of the abovementioned mixture at a pressure of approximately 100 bars to approximately 280 bars, in particular approximately 100 bars to approximately 250 bars, advantageously approximately 100 bars to approximately 200 bars, and preferably approximately 200 bars, in order to obtain a homogenized mixture,
- a stage of heating the abovementioned homogenized mixture, said heating being carried out at a heating temperature of approximately 85° C. to approximately 100° C., in particular approximately 87° C. to approximately 97° C., advantageously approximately 87° C. to approximately 95° C., and preferably being carried out at approximately 95° C., in order to obtain a heated homogenized mixture, and
- a stage of holding the abovementioned heated homogenized mixture, in order to obtain a heated and homogenized held mixture,
- a stage of fermentation of the abovementioned heated and homogenized held mixture, carried out at a temperature of approximately 30° C. to approximately 47° C., in particular approximately 35° C. to approximately 45° C., and preferably approximately 38° C. to approximately 42° C., in order to obtain a fermented mixture, and
- a smoothing stage of the abovementioned fermented mixture, in order to obtain a final white mass, comprising a fatty phase, corresponding to the sterol and/or stanol ester, included by the homogenization stage in the protein network formed by the milk proteins and the milk of the abovementioned initial composition as defined above, said final white mass being characterized in that it exhibits a homogeneity between the fatty phase and the protein network, and exhibits no phase difference between the aqueous phase and the protein network,
- a stage of addition of a fruit preparation without sterol and/or stanol in any form whatever, and
- a stage of mixing of the abovementioned final white mass using a dynamic or static mixer, before said dairy product is put into pots.

According to an advantageous embodiment of the invention, said holding stage is carried out for a period of approximately 4 minutes to approximately 10 minutes, in particular approximately 5 to approximately 8 minutes, and preferably for approximately 6 minutes.

This method makes it possible to obtain a dairy product of stirred fruit yogurt type.

An advantageous method according to the present invention is a method as defined above, characterized in that the fruit preparation contains a thickener, in particular chosen from: alginates, xanthan gum, pectin, starch, in particular gelatinized, gelan gum, cellulose and its derivatives, guar and carob gum, and inulin, the concentration of these thickeners being approximately 0.4% to approximately 3% relative to the fruit preparation.

According to an advantageous embodiment, the method according to the invention is characterized in that the initial composition comprises milk, milk powder, milk proteins and an agent in a concentration such that it limits syneresis, said agent being in particular chosen from: the alginates, maltodextrins, pectins, soluble fibres, starch and inulin, and preferably being starch.

By "agent limiting syneresis" is meant a compound having a strong hydrophilic character allowing it to retain water (serum) not retained by the protein network formed during the acidification.

The agent used within the framework of the present invention is of a nature and concentration such that it has no viscosing effect on the lactic gel (structure formed by the milk proteins).

The present invention also relates to a method as defined above, characterized in that the sterol and/or stanol ester is chosen from the group comprising: 22-dihydroerogosterol, 7,24(28)-erogostadienol, campesterol, neospongosterol, 7-ergostenol, cerebisterol, corbisterol, stigmasterol, focosterol, α-spinasterol, sargasterol, 7-dehydrocryonasterol, poriferasterol, chondrillasterol, β-sitosterol, cryonasterol (γ-sitosterol), 7-stigmastenol, 22-stigmastenol, dihydro-γ-sitosterol, β-sitostanol, 14-dehydroergosterol, 24(28)-dehydroergosterol, ergosterol, brassicasterol, ascosterol, episterol, fecosterol and 5-dihydroergosterol, and their mixtures and is advantageously β-sitosterol, β-sitostanol, β-sitostanol ester, campesterol or brassicasterol.

The present invention also relates to a method as defined above, characterized in that the ratio of the sterol and/or stanol ester flow rate to the initial milk-based composition flow rate ranges from approximately 0.5 to approximately 3.

The present invention also relates to a product as obtained according to the method of the invention as defined above.

The present invention also relates to a product as obtained according to the method of the invention, being presented in the form of a dairy product of firm natural yogurt type.

The present invention also relates to a product as obtained according to the method of the invention, being presented in the form of a dairy product of natural or fruit stirred yogurt type or of drinking yogurt type.

The present invention also relates to a product as defined above, containing approximately 0.1% to approximately 3% sterol and/or stanol ester, and in particular approximately 0.5% to approximately 2.5% sterol and/or stanol ester, advantageously approximately 1% to approximately 1.6% sterol and/or stanol ester.

The present invention also relates to a device for the implementation of the method as defined above, of continuous introduction, via a production line, of at least one sterol and/or stanol ester at a given temperature $T_1$, higher than or equal to the melting temperature of said ester, and in particular ranging from 35 to 80° C., into a dairy composition at a temperature $T_2$ higher than or equal to the temperature $T_1$, characterized in that it comprises the following elements:

means making it possible to maintain the abovementioned sterol and/or stanol ester at the temperature $T_1$, such as a heat-insulated tank or a thermostatically controlled vat, means making it possible to circulate said ester towards a production line supply means, whilst maintaining said ester at the temperature $T_1$, such as a heat-insulated tube, and supply means making it possible to introduce said ester at the temperature $T_1$, into the production line, such as a positive pump.

An advantageous device of the invention comprises means for circulation of the dairy composition heated to the abovementioned temperature $T_2$, and is such that the abovementioned pump circulates the ester at a flow rate proportional to the circulation flow rate of the abovementioned dairy composition heated to the temperature $T_2$.

The present invention also relates to a preparation method for a dessert-type product. Said method is carried out starting with an initial dairy composition containing at least one thickener and/or at least one gelling agent. This method corresponds to that of the invention and comprises more particularly a stage of preheating the initial dairy composition, a stage of injection of the molten sterol and/or stanol ester, a stage of homogenization, a heating stage at a temperature of approximately 85° C. to approximately 130° C., in particular at 120° C.

FIG. 1

FIG. 1 represents the preparation method for a firm yogurt, into which a molten sterol and/or stanol ester is introduced after the preheating stage.

More precisely the tank containing the dairy composition (dairy mix) is represented by (1).

The dairy composition is preheated to a temperature of approximately 50° C. to approximately 70° C. represented by (2).

The introduction of the sterol and/or stanol ester into the preheated dairy composition in a quantity of approximately 0.5% to approximately 3%, molten at a temperature of approximately 35° C. to approximately 80° C., is represented by (3).

The stage of homogenization of the mixture obtained in the preceding stage, at a pressure of approximately 100 to approximately 250 bars is represented by (4).

The stage of heating the homogenized mixture obtained in the preceding stage at a temperature of approximately 87° C. to approximately 97° C. is represented by (5), and the stage of holding the heated homogenized mixture for approximately 4 to 10 minutes by (6).

The heated and homogenized held mixture is then cooled down to a temperature of approximately 47° C. to approximately 30° C. (7) then the ferments are added (8).

The mixture is then put into pots (9) followed by oven drying at fermentation temperature (10), then the fermentation is stopped by refrigerating (11).

The stages indicated above correspond to the "method" part represented by the bracketed section (A) in FIG. 1.

Stages (9), (10) and (11) correspond to the "conditioning" part represented by the bracketed section (B) in FIG. 1.

The firm yogurt obtained contains 0.5% to 3% sterol and/or stanol ester.

FIG. 2

Figure 2:
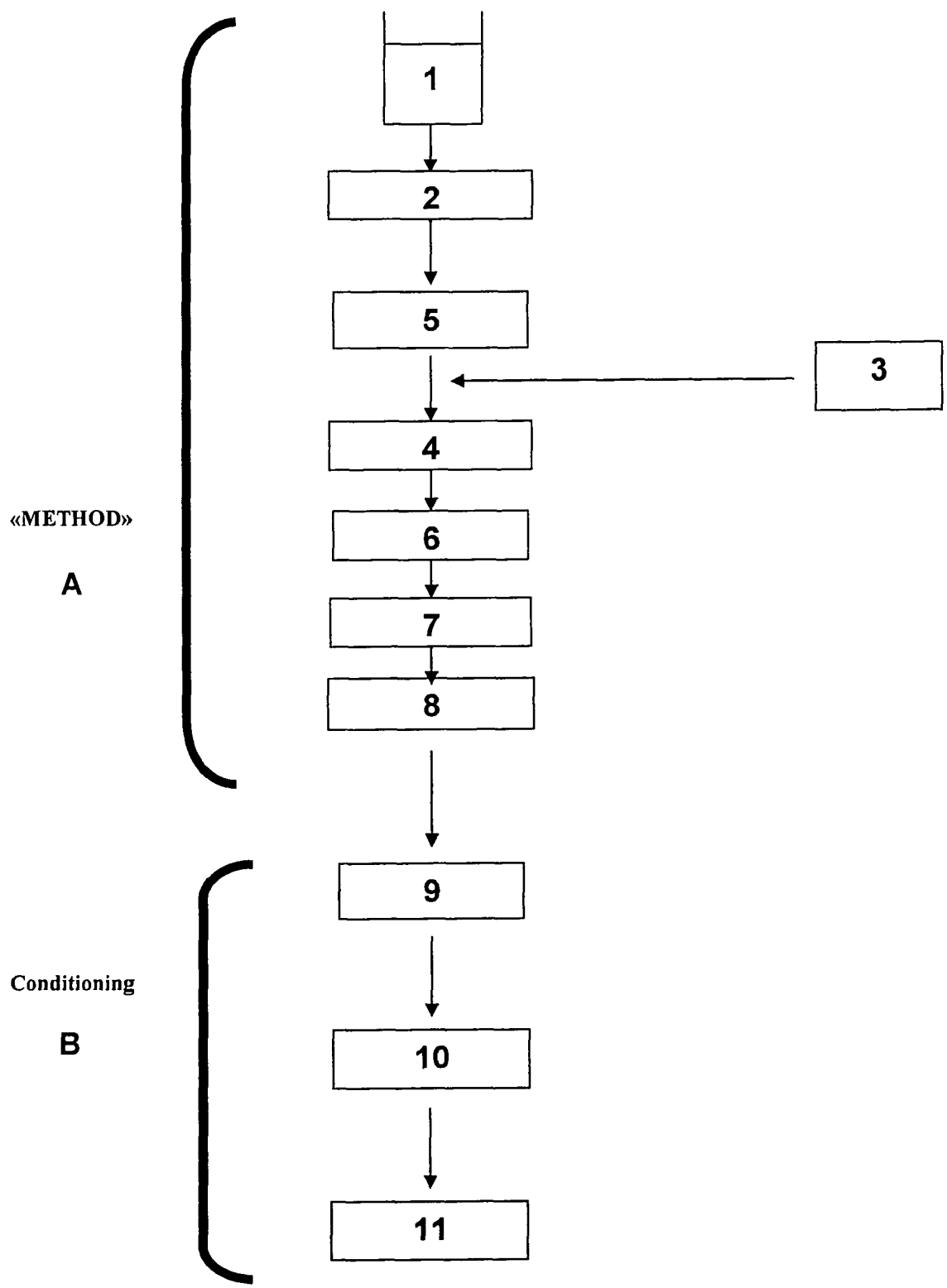
FIG. 2 represents a variant of the preparation method for a firm yogurt.

FIG. 2 represents a variant of the preparation method for a firm yogurt, in which the introduction (3) of the sterol or stanol, in the form of approximately 0.1% to approximately 3% molten ester sterol at a temperature of approximately 35 to approximately 80° C. or approximately 0.5% to approximately 3% molten ester sterol at a temperature of approximately 60 to approximately 80° C. is carried out after the stage of heating (5) the dairy composition preheated in (2).

The introduction (3) of the sterol or stanol ester is followed by a homogenization stage (4) at a pressure of approximately 100 to approximately 250 bar of the mixture obtained in the preceding stage, then followed by a holding stage.

It should be noted that in this figure, the figures and numbers (1 to 11) and letters (A and B) used have the same meanings as those indicated in FIG. 1.

The firm yogurt obtained contains 0.5 to 3% sterol or stanol ester.

FIG. 3

Figure 3:
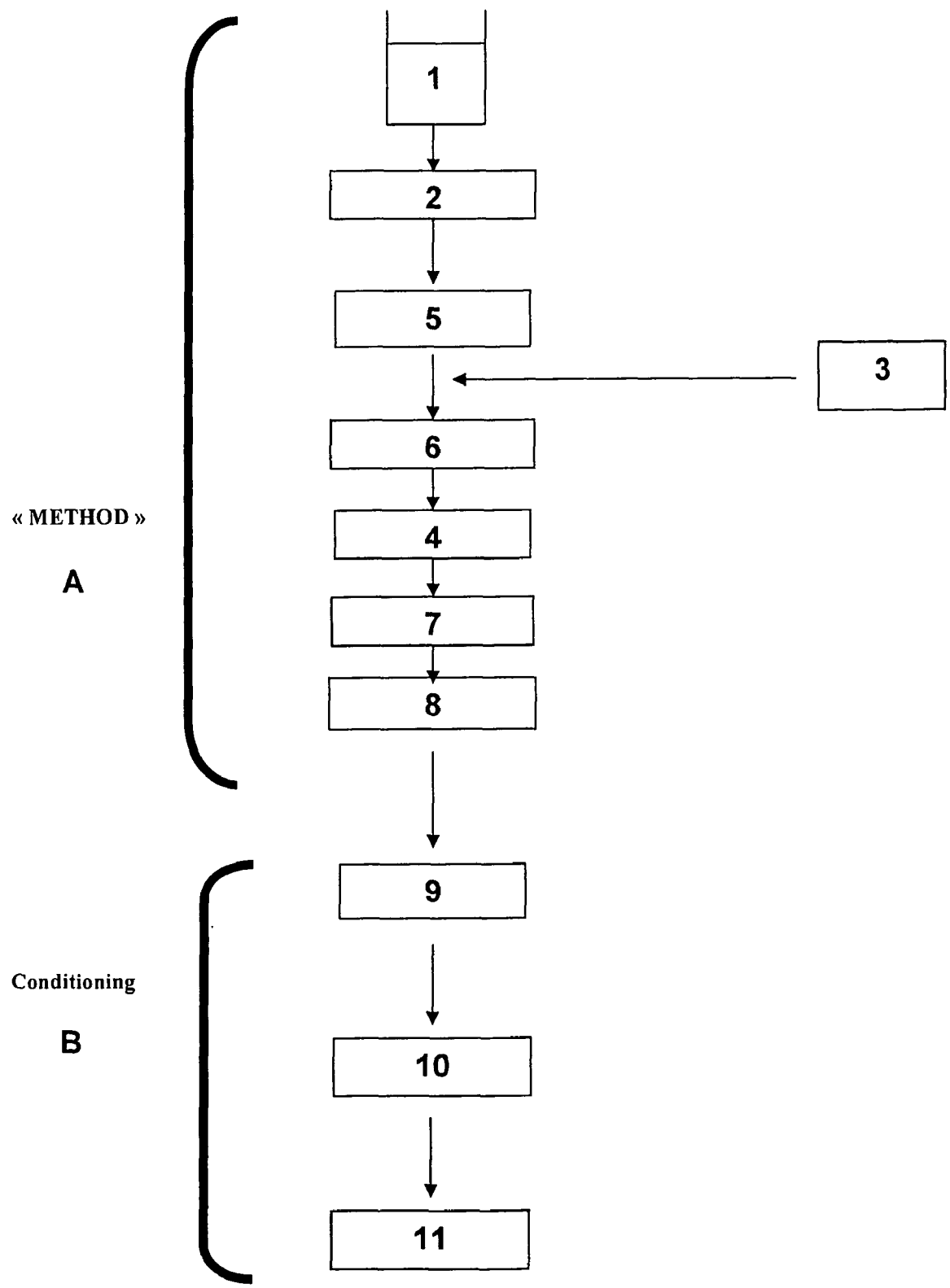
FIG. 3 represents a variant of the preparation method for firm yogurt, in which the introduction of the sterol or stanol, in the form of sterol ester or stanol ester, is carried out in the quantities and at the melting temperatures indicated in FIG. 2.

FIG. 3 represents a variant of the preparation method for firm yogurt, in which the introduction (3) of the sterol or stanol, in the form of sterol ester or stanol ester is carried out in the quantities and at the melting temperatures indicated in FIG. 2.

The introduction (3) of the sterol or stanol is followed by a holding stage (6) then by a homogenization stage (4) which makes it different from the method of FIG. 2, in which the stage of introduction of the sterol or stanol is followed by a homogenization stage (4) then a holding stage (6).

In this figure, the figures and numbers (1 to 11) and letters (A and B) used have the same meanings as those indicated in FIG. 1 and FIG. 2.

The firm yogurt obtained contains 0.5 to 3% sterol or stanol ester.

FIG. 4

Figure 4:
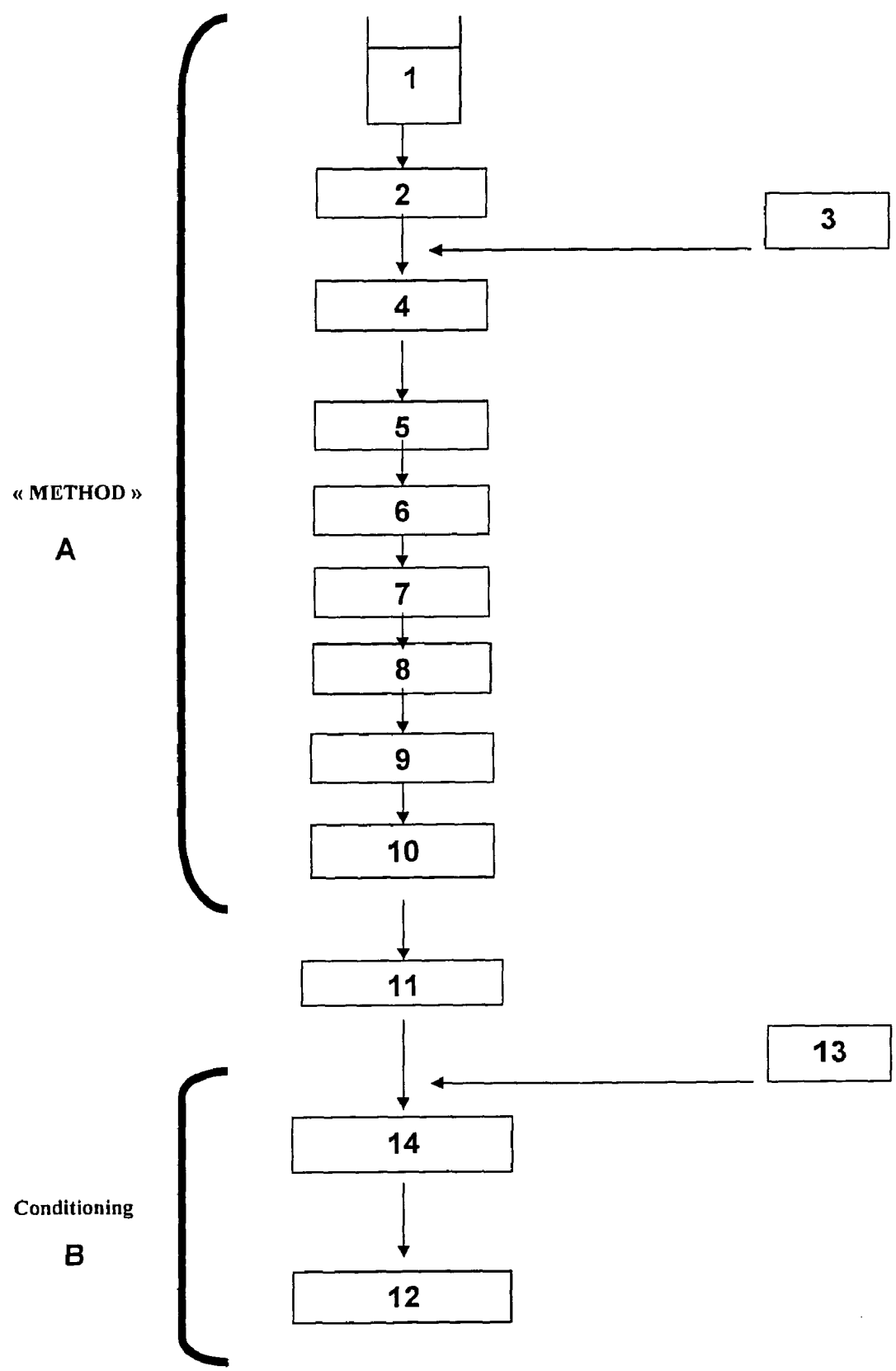
FIG. 4 represents the preparation method for a stirred yogurt, into which a molten sterol ester is introduced after the preheating stage.

FIG. 4 represents the preparation method for a stirred yogurt, into which a molten sterol ester is introduced after the preheating stage.

More precisely the tank containing the dairy composition (dairy mix) is represented by (1).

The dairy composition is preheated to a temperature of approximately 50° C. to approximately 80° C. represented by (2).

The introduction of the sterol and/or stanol ester into the preheated dairy composition in a quantity of approximately 0.5 to approximately 3%, molten at a temperature of approximately 35° C. to approximately 80° C. is represented by (3).

The stage of homogenization of the mixture obtained in the preceding stage, at a pressure of approximately 100 to approximately 250 bars is represented by (4).

The stage of heating the homogenized mixture obtained in the preceding stage, at a temperature of approximately 87° C. to approximately 97° C., is represented by (5) and the stage of holding the heated homogenized mixture, for approximately 4 to 10 minutes, by (6).

The heated and homogenized held mixture is then cooled down to a temperature of approximately 47° C. to 30° C. (7) then ferments are added (8) followed by fermentation at a temperature of approximately 30° C. to approximately 47° C. (9).

Smoothing is then carried out followed by cooling down in order to stop the fermentation (10) in order to obtain a final white mass (11) which corresponds to the natural stirred finished product, which put into pots in stage (12).

In the case of the preparation of a stirred fruit yogurt, a fruit preparation is introduced (13) into the final white mass followed by mixing using a dynamic or static mixer (14) then putting into pots (12).

Stages (1) to (10) indicated above correspond to the "method" part represented by the bracketed section (A) in FIG. 4.

The stages (12), (13) and (14) correspond to the "conditioning" part represented by the bracketed section (B) in FIG. 4.

The firm yogurt obtained contains 0.5% to 3% sterol or stanol ester.

FIG. 5

Figure 5:
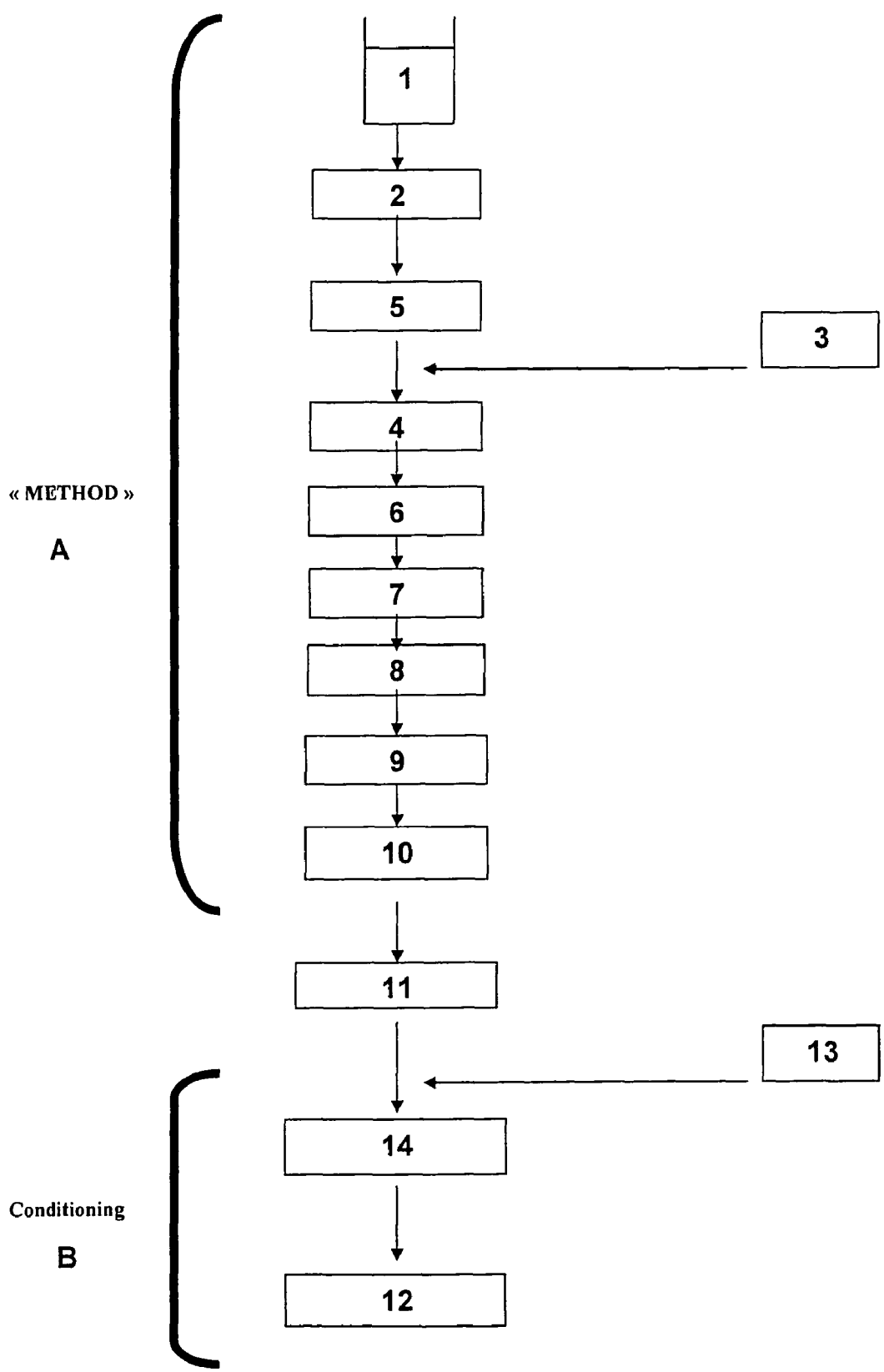
FIG. 5 represents a variant of the preparation method for a stirred natural or fruit yogurt.

FIG. 5 represents a variant of the preparation method for a stirred natural or fruit yogurt, into which the introduction (3) of the sterol or stanol, in the form of approximately 0.5% to approximately 3% molten sterol ester at a temperature of approximately 35 to approximately 80° C. or approximately 0.5% to approximately 3% molten ester sterol at a temperature of approximately 60 to approximately 80° C. is carried out after the stage of heating (5) of the dairy composition preheated in (2).

The introduction (3) of the sterol or stanol ester is followed by a homogenization stage (4) at a pressure of approximately 100 to approximately 250 bars of the mixture obtained in the preceding stage, followed by a holding stage.

It should be noted that in this figure, the figures and numbers (1 to 4) and letters (A and B) used have the same meanings as those indicated in FIG. 4.

The firm yogurt obtained contains 0.5 to 3% of sterol or stanol ester.

FIG. 6

Figure 6:
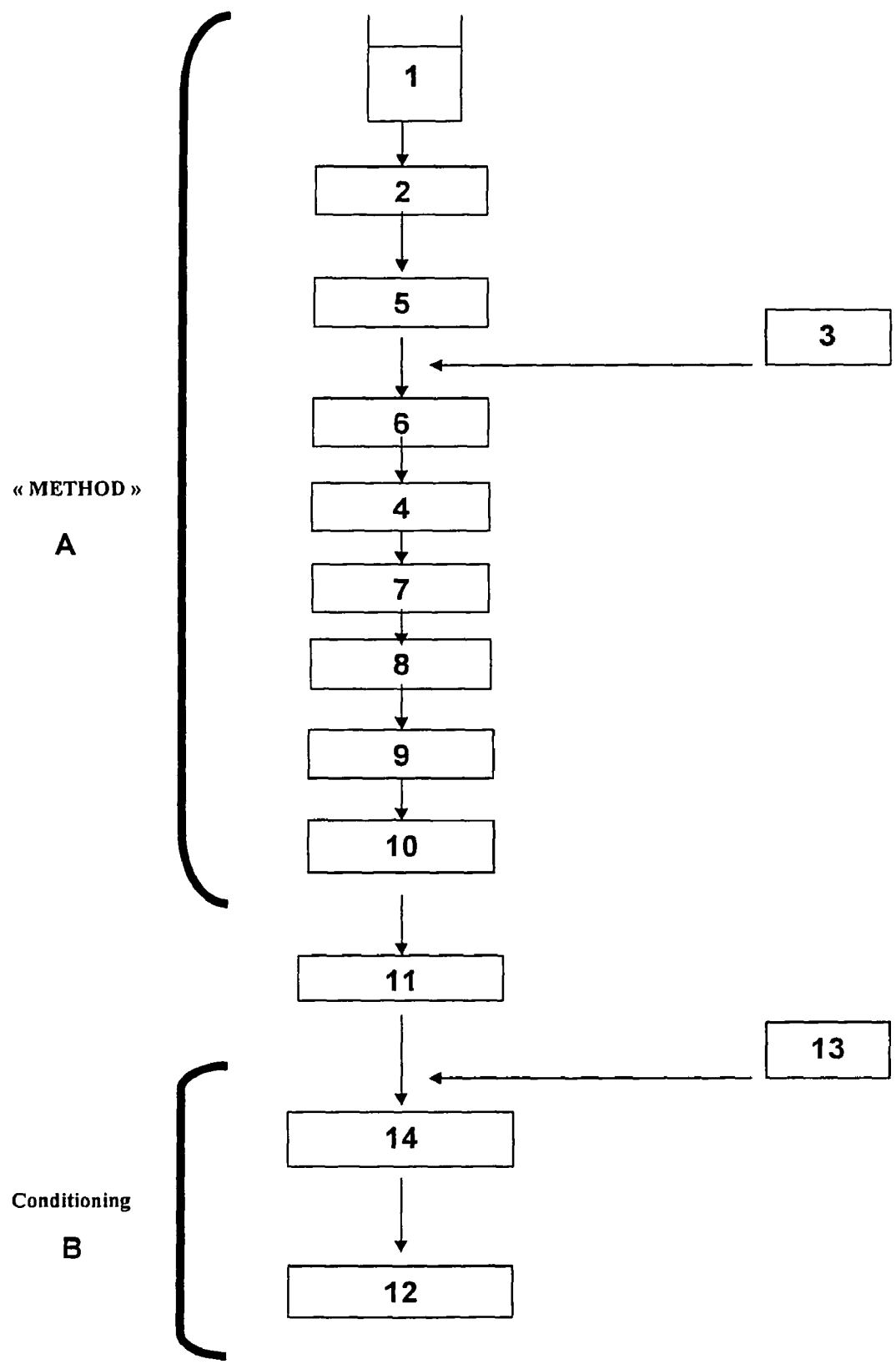
FIG. 6 represents a variant of the preparation method for stirred natural or fruit yogurt, in which the introduction of the sterol or of the stanol, in the form of sterol ester or stanol ester is carried out in the quantities and at the melting temperatures indicated in FIG. 5.

FIG. 6 represents a variant of the preparation method for stirred natural or fruit yogurt, in which the introduction (3) of the sterol or of the stanol, in the form of sterol ester or stanol ester is carried out in the quantities and at the melting temperatures indicated in FIG. 5.

The introduction (3) of the sterol or stanol is followed by a holding stage (6) then a homogenization stage (4) which makes it different from the method of FIG. 5, in which the stage of introduction of the sterol or stanol is followed by a homogenization stage (4) then by a holding stage (6).

In this figure, the figures and numbers (1 to 14) and letters (A and B) used have the same meanings as those indicated in FIG. 4 and FIG. 5.

The firm yogurt obtained contains 0.5% to 3% sterol or stanol ester.

FIG. 7

Figure 7:
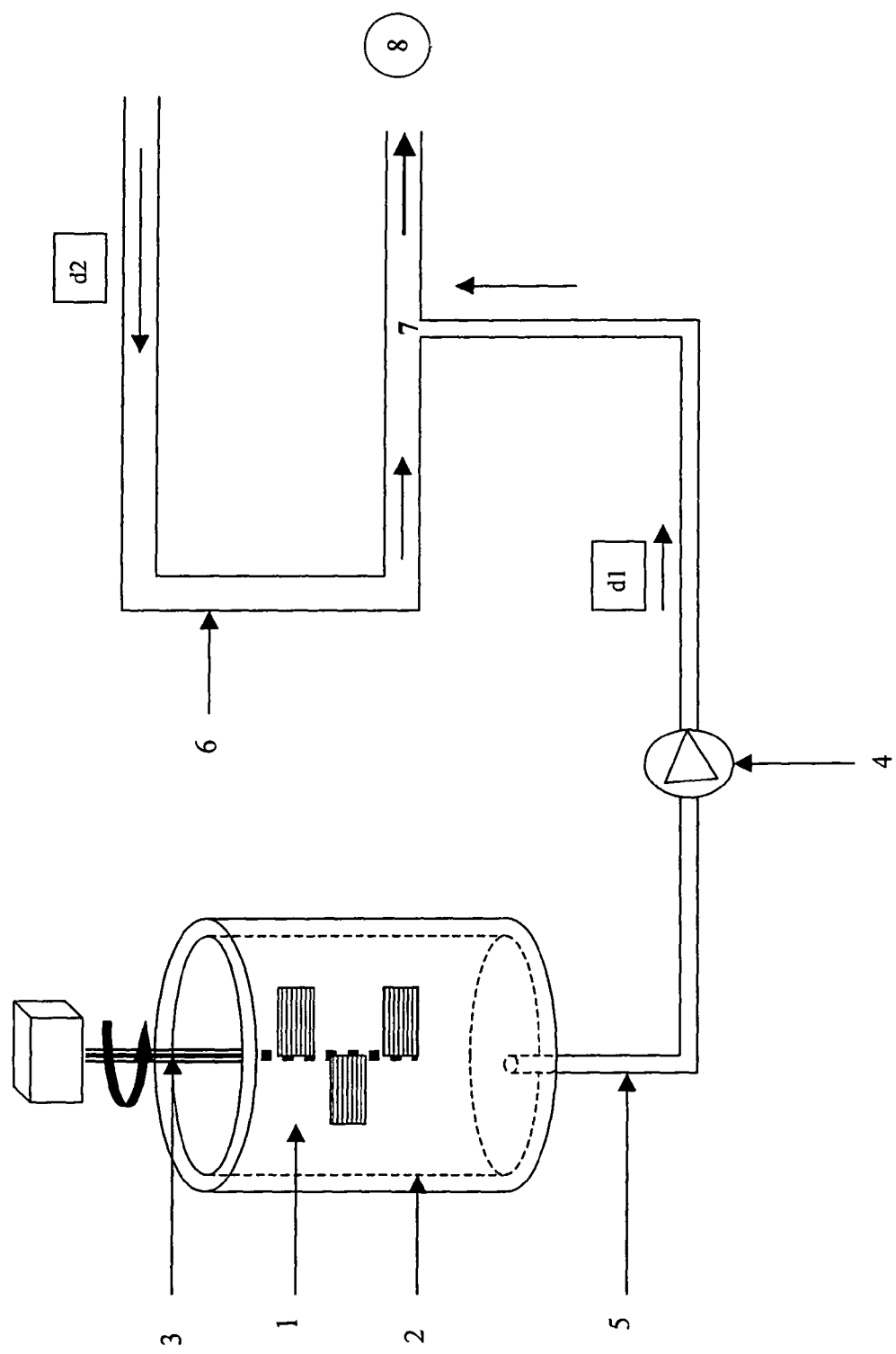
FIG. 7 represents a so-called "in-line" injection system.

FIG. 7 represents a so-called "in-line" injection system, comprising a thermostatically controlled vat (1) containing the molten stanol and/or the sterol ester, the latter being maintained at a temperature of 45-70° C. (higher than the melting temperature) by a warm water circulation system the temperature of which is regulated in the jacket of the vat (2), the stanol and/or sterol ester being stirred in this vat by the rotation of blades about a shaft (3) in order to render the temperature in this vat homogeneous. The stanol and/or sterol ester in the liquid form is then pumped by a PCM positive-type pump (4) via a heat-insulated pipe (5) at a continuously determined and measured flow rate d1, this flow rate d1 being proportional to the flow rate d2 of the pipe (6) in which the dairy composition heated to a temperature higher than the melting temperature of the stanol and/or sterol ester circulates. The pipes (5) and (6) join at a point (7). Thus a homogeneous dispersion of the stanol and/or sterol ester is made possible by ensuring the turbulent flow of the dairy composition. This mixture is then conveyed towards the homogenizer (8) in order to disperse the stanol and/or sterol ester in the protein matrix in optimum manner.

Example 1

Preparation method for a natural yogurt free of dairy fats.

The initial dairy composition comprises:

milk with 0.50% fat, at a rate of approximately 70% to approximately 97%, in particular at a rate of 94.6%;

skimmed milk powder at a rate of approximately 0 to 5%, in particular at a rate of 3.7%;

milk proteins at a rate of approximately 0.2 to approximately 0.8%, in particular at a rate of 0.6%;

native starch in a quantity such that it limits syneresis, and in particular 0 to approximately 0.5%, and in particular 0.3%;

0 to approximately 10% sugar and 0 to approximately 25% water.

This initial dairy composition is placed in a float hopper in the production line, at a temperature of approximately 10° C., for a sufficient time to rehydrate all of the dairy ingredients defined above, then preheated to a temperature of approximately 70 to 80° C.

After the preheating of the initial dairy composition, molten sterol esters are introduced in quantities such that they are present in the finished product in a quantity of 0.5% to 2.5%, followed by homogenization at a pressure of 100 to 250 bars.

The mixture obtained above is heated at a temperature of 90 to 95° C. in order to pasteurize, for 3 to 8 minutes, then cooled down to a temperature of 35° C. to 45° C., and the cooled mixture is seeded with lactic strains and packaged in pots, to carry out the fermentation in the pots to pH 4.8-4.5, in order to obtain a firm natural yogurt.

The firm natural yogurt thus obtained is refrigerated in order to stop the fermentation.

In order to obtain a stirred natural yogurt, smoothing was carried out by stirring the fermented white mass and the fermentation of the white mass obtained is stopped by passing the latter over a plate heat exchanger, cooling down to 20° C. then packaging in pots.

In order to obtain a drinking yogurt, the fermentation of the final white mass obtained is stopped by passing over a plate heat exchanger, cooling down to 4° C., then smoothed by passing into a smoothing nozzle making it possible to obtain a drinking yogurt texture, followed by packaging.

Example 2

Preparation of a stirred fruit yogurt, containing 18% fruit composition.

A stirred fruit yogurt is prepared by proceeding as in Example 1, into which, after smoothing and cooling down, a fruit preparation containing 48.3% concentrated fruits, 44.4% sugar, 0.3% pectin, 1.4% starch, 0.02 colouring, 0.5% flavouring and 5.08% water is introduced.

Example 3

Preparation of a stirred fruit yogurt, containing 22% fruit composition.

A stirred fruit yogurt is prepared by proceeding as in Example 1, into which, after smoothing and cooling down, a fruit preparation containing 55.7% concentrated fruits, 36.3% sugar, 0.12% xanthan, 1.5% starch, 0.019% colouring, 0.5% flavouring and 5.861% water is introduced.

Example 4

Preparation method for a fruit drinking yogurt containing 5% fruit composition.

By proceeding as in Example 1, a fruit drinking yogurt is prepared, into which, after smoothing and cooling down, a fruit preparation containing 42% concentrated fruits, 32.4% sugar, 1% colouring, 0.6% flavouring, 0.7% starch and 23.3% water is introduced.

Comparative Example 1

The results of this example clearly show that it is more difficult to obtain a satisfactory product when hydrocolloids (such as thickeners) are added to the product.

Thus, the method used is the method according to the present invention comprising the following characteristic stages:
- a stage of preheating an initial milk-based composition, containing milk proteins and without emulsifier, at a preheating temperature of approximately 50° C. to approximately 70° C., in order to obtain a dairy composition at the preheating temperature,
- a stage of introduction into the abovementioned dairy composition at the preheating temperature, of at least one sterol and/or stanol ester at a temperature $T_1$ of approximately 50° C. to approximately 65° C., in order to obtain a mixture,
- a stage of heating the abovementioned mixture, said heating being carried out at a heating temperature $T_2$ of approximately 95° C., in order to obtain a mixture at the heating temperature,
- a stage of holding the abovementioned mixture at the heating temperature, said holding stage being carried out for a period of approximately 6 minutes, in order to obtain a held mixture,
- a stage of homogenization of the abovementioned held mixture at a pressure of approximately 200 bars, in order to obtain a homogenized mixture.

For comparison, the method was used for an initial dairy composition free of hydrocolloids, and to an initial dairy composition containing hydrocolloids (xanthan and starch).

It is noted that the initial dairy composition which is free of hydrocolloids has a dense protein network with a fairly good homogeneity of the fatty phase (dispersed fatty phase well inserted into the protein network). The product thus obtained is very firm, whereas the initial dairy composition containing hydrocolloids has a strong heterogeneity (phase separation between the milk proteins and the xanthan gum). The heterogeneity of the mixture is also visible on a macroscopic scale due to the granular texture of the finished product.

These results make it possible to demonstrate the benefit of not using hydrocolloids in the initial dairy composition, as the hydrocolloids prevent the suitable formation of the protein network.

Comparative Example 2

The purpose of this example is to compare the method of the present invention comprising the in-line injection of the molten sterol or stanol esters in a method comprising the heating of a dairy composition after the incorporation of molten sterol or stanol esters into a non-heated initial dairy composition.

1) COMPOSITION OF THE INITIAL DAIRY COMPOSITION

Case of Firm or Stirred Yogurt:
Ingredients:

| | |
|---|---|
| 0.5% Milk: | 95.4% |
| Skimmed milk powder: | 3.7% |
| Dairy protein: | 0.6% |
| Rice starch: | 0.3% |

Protein Characteristics:

| | |
|---|---|
| Proteins: | 5.0% |
| Caseins: | 3.65% |
| Serum proteins: | 1.35% |
| Casein/serum proteins ratio: | 2.7 |

Case of Drinking Yogurt:
Ingredients:

| | |
|---|---|
| 0.5% Milk: | 82.65% |
| Water: | 10.0% |
| Sugar: | 7.0% |
| Dairy protein: | 0.35% |

Protein Characteristics.

| | |
|---|---|
| Proteins: | 3.0% |
| Caseins: | 2.18% |
| Serum proteins: | 0.79% |
| Casein/serum proteins ratio: | 2.7 |

2) METHOD FOR OBTAINING THE PRODUCTS

According to the Comparison Method:

This method corresponds to the heating of a dairy composition comprising the initial dairy composition and the molten sterol or stanol esters. Thus the ingredients in paragraph 1 are mixed in order to form an initial dairy composition, into which the molten sterol or stanol esters are incorporated. The dairy composition thus obtained is heated to 70° C.-80° C. under stirring, making it possible to produce a homogeneous suspension for a maximum period of 2 hours. This case corresponds to the introduction of sterol and/or stanol esters into the milk in the same way as the other ingredients introduced into the composition of the dairy preparation. In this case, there is therefore a standard utilization of the ingredients for yogurt technology.

According to the Method of the Invention:

This method corresponds to the in-line injection of the molten sterol or stanol esters.

Thus the ingredients mentioned in paragraph 1 are mixed for a maximum period of 2 hours at a maximum temperature of 10° C., which makes it possible to obtain an initial dairy composition in which the milk proteins have been rehydrated. Then, the abovementioned initial dairy composition is preheated to a temperature of approximately 70° C.-80° C., in order to obtain a preheated dairy composition, into which molten sterol or stanol esters are injected in-line.

The succession of the following stages concerning in particular homogenization and fermentation is identical in the two cases and corresponds to the method of the present invention.

3) PRODUCTS OBTAINED FROM THESE TESTS

P1 Firm yogurt obtained from a heated dairy composition with ester
P1' Firm yogurt obtained from the injection of ester
P2 Stirred yogurt obtained from a heated dairy composition with ester
P2' Stirred yogurt obtained from the injection of ester
P3 Drinking yogurt obtained from a heated dairy composition with ester
P3' Drinking yogurt obtained from the injection of ester

4) MEASUREMENTS CARRIED OUT ON THESE PRODUCTS

As regards the organoleptic measurements carried out on a sample of consumers:
- with regard to the serum, a low mark was obtained corresponding to the fact that, when the yogurt is cut, the serum is not released from the lactic gel in the yogurts according to the invention;
- with regard to the homogeneity of the gel, a higher mark was obtained for the yogurt of the invention, corresponding to the fact that the gel is more brittle in the yogurt of the invention, as it is more homogeneous than that obtained with the comparison method.
- with regard to thickness in the mouth, the yogurt of the invention obtained a higher mark than that obtained by the comparison method, as it is less thick;
- with regard to the rancid taste, a mark of zero was obtained for the yogurt of the invention:
- moreover, the consumers noted a "cooked" taste for the yogurt obtained according to the comparison method.

| Products | Instrument measurements Rheomatic viscosity | Water retention | Characterization of the fat in the protein network Microscopic observation | Chemical measurements Peroxide index | Organoleptic measurements (marks from 0-5) Serum/ decantation | Homogeneity of the gel | Thickness in mouth | Rancid taste | "Cooked" taste |
|---|---|---|---|---|---|---|---|---|---|
| P1 | | START OF PRESERVATION | START OF PRESERVATION | START AND END OF PRESERVATION | START AND END OF PRESERVATION | START AND END OF PRESERVATION | | START AND END OF PRESERVATION | START AND END OF PRESERVATION |
| P1' | | START OF PRESERVATION | START OF PRESERVATION | START AND END OF PRESERVATION | START AND END OF PRESERVATION | START AND END OF PRESERVATION | | START AND END OF PRESERVATION | START AND END OF PRESERVATION |
| P2 | START AND END OF PRESERVATION | START OF PRESERVATION | START OF PRESERVATION | START AND END OF PRESERVATION | | | START AND END OF PRESERVATION | START AND END OF PRESERVATION | START AND END OF PRESERVATION |
| P2' | START AND END OF PRESERVATION | START OF PRESERVATION | START OF PRESERVATION | START AND END OF PRESERVATION | | | START AND END OF PRESERVATION | START AND END OF PRESERVATION | START AND END OF PRESERVATION |
| P3 | START AND END OF PRESERVATION | START OF PRESERVATION | START OF PRESERVATION | START AND END OF PRESERVATION | START AND END OF PRESERVATION | | START AND END OF PRESERVATION | START AND END OF PRESERVATION | START AND END OF PRESERVATION |
| P3' | START AND END OF PRESERVATION | START OF PRESERVATION | START OF PRESERVATION | START AND END OF PRESERVATION | START AND END OF PRESERVATION | | START AND END OF PRESERVATION | START AND END OF PRESERVATION | START AND END OF PRESERVATION |

The measurement results show:
- that the yogurts obtained according to the method of the invention have a greater viscosity than those obtained by the comparison method, which corresponds to a greater firmness;
- that the gels ability to retain water under stress is greater in the case of the yogurts obtained according to the invention;
- that the peroxide index is significantly high in the case of the yogurts obtained according to the comparison method, than in the case of the invention.

5) CONCLUSION

The comparison method, corresponding to the heating of a dairy composition comprising the initial dairy composition and the molten sterol or stanol esters, has the following drawbacks:
a) This dairy composition is heated in the presence of air dissolved because of stirring; it is therefore capable of oxidizing the unsaturated fatty acids of the esters (esterification in the presence of rapeseed oil naturally rich in C18:2, and C18:3), which produces peroxides, then hydroperoxides known to generate rancid tastes which are unacceptable for a food product. Moreover, these compounds are capable of oxidizing of the nutritionally useful molecules such as vitamins (C, E and A) as well as certain amino acids (methionine and tryptophan).

b) The long stage of heating between 70° C. and 80° C. of the dairy composition comprising the initial dairy composition and the molten sterol or stanol esters (up to 2 hours) is also capable of degrading the serum proteins, which have a considerable functional importance in the yogurt-production technologies (emulsification of the fats, serum retention, viscosity).

c) The "maillardization", in the presence of sugar (lactose) and amino acids, of the molecular polymerization reactions can result in colour changes (browning) as well as "cooked" tastes; moreover this reaction mobilizes lysine, an essential amino acid.

The invention claimed is:

1. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said ester, included by said homogenizing in said protein network formed by said milk proteins and milk of said dairy composition, said final white mass exhibiting a homogeneity between said fatty phase and said protein network, and exhibiting no phase difference between said aqueous phase and said protein network; and adding a fruit preparation without sterol and/or stanol to said final white mass.

2. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said ester, included by said homogenizing in said protein network formed by said milk proteins and milk of said dairy composition, said final white mass exhibiting a homogeneity between said fatty phase and said protein network, and exhibiting no phase difference between said aqueous phase and said protein network; and adding a cereal composition without sterol and/or stanol to said final white mass.

3. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said ester, included by said homogenizing in said protein network formed by said milk proteins and milk of said dairy composition, said final white mass exhibiting a homogeneity between said fatty phase and said protein network, and exhibiting no phase difference between said aqueous phase and said protein network; and adding a fruit preparation without sterol and/or stanol to the final white mass, said fruit preparation comprising a thickener selected from the group consisting of xanthan gum, pectin, starch, gelan gum, cellulose and its derivatives, guar gum, carob gum, and inulin, said thickeners being approximately present in a concentration of 0.4% to approximately 3% of said fruit preparation.

4. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture for a duration of approximately 4 minutes to approximately 10 minutes to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said ester, included by said homogenizing in said protein network formed by said milk proteins and milk of said dairy composition, said final white mass exhibiting a homogeneity between said fatty phase and said protein network, and exhibiting no phase difference between said aqueous phase and said protein network.

5. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture for a duration of approximately 4 minutes to approximately 10 minutes to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said ester, included by said homogenizing in said protein network formed by said milk proteins and milk of said dairy composition, said final white mass exhibiting a homogeneity between said fatty phase and said protein network, and exhibiting no phase difference between said aqueous phase and said protein network; and adding a cereal composition without sterol and/or stanol to said final white mass.

6. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture for a duration of approximately 4 minutes to approximately 10 minutes to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said sterol ester and/or stanol ester, included by said homogenizing in said protein network formed by said milk proteins and milk of said dairy composition, said final white mass exhibiting a homogeneity between said fatty phase and said protein network, and exhibiting no phase difference between said aqueous phase and said protein network; and adding a fruit preparation without sterol and/or stanol to said final white mass.

7. A method of preparing a dairy product in a production line comprising:

introducing by continuous injection, via the production line, at least one sterol ester and/or stanol ester into a dairy composition to obtain a mixture, said sterol ester and/or stanol ester being at a temperature $T_1$, higher than or equal to the melting temperature of said sterol ester and/or stanol ester and ranging from 35 to 80° C., and said dairy composition having a temperature $T_2$ at least equal to $T_1$, wherein, said sterol ester and/or stanol ester is introduced without thickener and without emulsifier, said dairy composition is obtained by treating a milk-based initial composition containing milk proteins and is without emulsifier, and introducing of said sterol ester and/or stanol ester takes place before homogenizing said mixture;

treating said milk-based initial composition by preheating to a temperature of approximately 50° C. to approximately 70° C. to obtain said dairy composition; said diary composition having a temperature $T_2$ of approximately 50° C. to approximately 70° C.;

homogenizing said mixture obtained from introducing said sterol ester and/or stanol ester to said dairy composition at a pressure of approximately 100 bars to approximately 280 bars to obtain a homogenized mixture;

heating said homogenized mixture at a heating temperature of approximately 85° C. to approximately 100° C. to obtain a heated homogenized mixture;

holding said heated homogenized mixture for a duration of approximately 4 minutes to approximately 10 minutes to obtain a heated and homogenized held mixture;

fermenting said heated and homogenized held mixture to a temperature of approximately 30° C. to approximately 47° C. to obtain a fermented mixture;

smoothing said fermented mixture to obtain a final white mass, comprising an aqueous phase, a protein network, and a fatty phase, said fatty phase corresponding to said sterol ester and/or stanol ester, included by said homogenizing in said protein network formed by said milk proteins and milk of said dairy composition, said final white mass exhibiting a homogeneity between said fatty phase and said protein network, and exhibiting no phase difference between said aqueous phase and said protein network; and adding a fruit preparation without sterol and/or stanol to said final white mass, said fruit preparation comprising a thickener selected from the group consisting of xanthan gum, pectin, starch, gelan gum, cellulose and its derivatives, guar gum, carob gum, and inulin, said thickeners being approximately present in a concentration of 0.4% to approximately 3% of said fruit preparation.

* * * * *